US011176172B2

(12) United States Patent
Gochkov et al.

(10) Patent No.: US 11,176,172 B2
(45) Date of Patent: Nov. 16, 2021

(54) METHODS AND APPARATUS FOR AUTOMATIC DATABASE FAILOVER IN A MASTER-REPLICA REPLICATION CONFIGURATION

(71) Applicant: VMware, Inc., Palo Alto, CA (US)

(72) Inventors: Gospodin Gochkov, Sofia (BG); Miroslav Mitevski, Sofia (BG); Nikola Atanasov, Sofia (BG); Diana Kovacheva, Sofia (BG); Borislav Ivanov, Sofia (BG)

(73) Assignee: VMware, Inc., Palo Alto, CA (US)

(*) Notice: Subject to any disclaimer, the term of this patent is extended or adjusted under 35 U.S.C. 154(b) by 579 days.

(21) Appl. No.: 15/979,075

(22) Filed: May 14, 2018

(65) Prior Publication Data

US 2019/0347352 A1 Nov. 14, 2019

(51) Int. Cl.
*G06F 16/00* (2019.01)
*G06F 16/27* (2019.01)
*G06F 11/20* (2006.01)
*H04L 29/08* (2006.01)
*G06F 11/16* (2006.01)
(Continued)

(52) U.S. Cl.
CPC ........ *G06F 16/275* (2019.01); *G06F 11/1464* (2013.01); *G06F 11/1469* (2013.01); *G06F 11/1662* (2013.01); *G06F 11/2069* (2013.01); *G06F 11/2092* (2013.01); *G06F 11/2094* (2013.01); *H04L 67/1002* (2013.01); *H04L 67/1095* (2013.01); *H04L 67/1097* (2013.01); *H04L 67/2814* (2013.01); *H04L 67/2895* (2013.01); *H04L 69/40* (2013.01); *G06F 2201/80* (2013.01)

(58) Field of Classification Search
CPC ...... G06F 16/275; G06F 9/5083; G06F 9/505; G06F 9/5088; G06F 2009/4557
USPC ................................ 707/611, 782; 718/105
See application file for complete search history.

(56) References Cited

U.S. PATENT DOCUMENTS

| 10,445,167 B1* | 10/2019 | Young | G06F 11/0772 |
| | | | 707/707 |
| 2012/0203825 A1* | 8/2012 | Choudhary | H04L 65/4076 |
| | | | 709/203 |

(Continued)

OTHER PUBLICATIONS

HAProxy, "HAProxy—The Reliable, High Performance TCP/HTTp Load Balancer," [http://www.haproxy.org/], retrieved on Feb. 14, 2018, 14 pages.

(Continued)

*Primary Examiner* — Alexandria Y Bromell
(74) *Attorney, Agent, or Firm* — Hanley, Flight and Zimmerman, LLC

(57) ABSTRACT

Methods, apparatus, systems and articles of manufacture for automatic database failover in a master-replica replication configuration are disclosed. An example node within a database system having a plurality of nodes, includes an agent to select a first database operated at one of the plurality of nodes to function as a master database in a master-replica replication configuration. The agent is to cause the selected database to be configured as the master database. The agent is to configure a first reverse proxy of the node. The first reverse proxy is to receive a query from a load balancer and forward the query to the master database based on the configuration.

20 Claims, 9 Drawing Sheets

(51) Int. Cl.
  *G06F 11/14*    (2006.01)
  *H04L 29/14*    (2006.01)

(56) References Cited

U.S. PATENT DOCUMENTS

| | | | | |
|---|---|---|---|---|
| 2014/0280522 A1* | 9/2014 | Watte | .................. | H04L 51/18 |
| | | | | 709/203 |
| 2015/0319226 A1* | 11/2015 | Mahmood | ........... | H04L 41/0893 |
| | | | | 709/201 |
| 2018/0048587 A1* | 2/2018 | Bai | .................. | H04L 47/52 |
| | | | | 707/707 |
| 2018/0115456 A1* | 4/2018 | Bendre | ............. | H04L 41/0663 |
| | | | | 707/707 |
| 2019/0025903 A1* | 1/2019 | Mehta | ................. | G06F 9/45558 |
| | | | | 707/707 |

OTHER PUBLICATIONS

Wikipedia, "Pgpool-II," [https://wiki.postgresql.org/index.php?title=Pgpool-II&oldid=20968], retrieved on Jan. 18, 2018, 3 pages.
Go, "The Go Programming Language," [https://golang.org/], retrieved on Jan. 18, 2018, 2 pages.
Fatdragon, "PostgreSQL HA with pgpool-11-Part 1," [https://fatdragon.me/blog/2016/05/postgresql-ha-pgpool-ii-part-1], dated May 18, 2016, 7 page.

* cited by examiner

METHODS AND APPARATUS FOR AUTOMATIC DATABASE FAILOVER IN A MASTER-REPLICA REPLICATION CONFIGURATION

FIELD OF THE DISCLOSURE

This disclosure relates generally to high-availability databases, and, more particularly, to methods and apparatus for automatic database failover in a master-replica replication configuration.

BACKGROUND

Database systems store and provide data to a requesting device(s). Being able to provide such information with high availability (e.g., little to no downtime), is an important part of operating and maintaining a database system. To provide high availability, some database systems operate multiple database nodes that are responsive to the requesting device(s).

BRIEF DESCRIPTION OF THE DRAWINGS

The figures are not to scale. In general, the same reference numbers will be used throughout the drawing(s) and accompanying written description to refer to the same or like parts

DETAILED DESCRIPTION

Database systems store and provide data to requesting device(s). Being able to provide such information with high availability (e.g., little to no downtime), is an important part of operating and maintaining a database system. To provide high availability, some database systems operate multiple database nodes that are responsive to the requesting device(s). Different schemes for providing high availability for a database system exist. For example, a master/replica model uses a first node that keeps an official copy of the data, while other (replica) nodes have a copy of some or all of the data. To prevent data loss, in some examples, the master-replica model is operated in a synchronous replication mode. In the synchronous replication mode, one of the replica nodes is completely in sync with the master node, such that no transaction is considered complete until it is confirmed on both the master node and the replica node. Unfortunately, a limitation of Master-Replica replication model is that only one server node in the cluster may be in read-write transactional mode, while the rest nodes are in read-only mode. This results in difficult implementation for highly available clusters that have ability to recover after failure of the leading master (Read-Write) node.

Example approaches disclosed herein build upon the synchronous replication mode, and provide for automated failover with a minimum downtime for Read/Write connections to the database. Moreover, during the failover downtime, the database remains available in a read mode. Example approaches disclosed herein utilize an agent and a reverse proxy implemented at each node in the database system.

In examples disclosed herein, the agent configures the node that it is implemented on, as well as monitors availability of other nodes. The example reverse proxy operates as an entry point for incoming requests. Instead of locally executing the incoming request, the reverse proxy forwards the incoming request to the database operated at the (current) master node. In this manner, incoming requests are ensured to reach the master node for execution.

Figure 1:
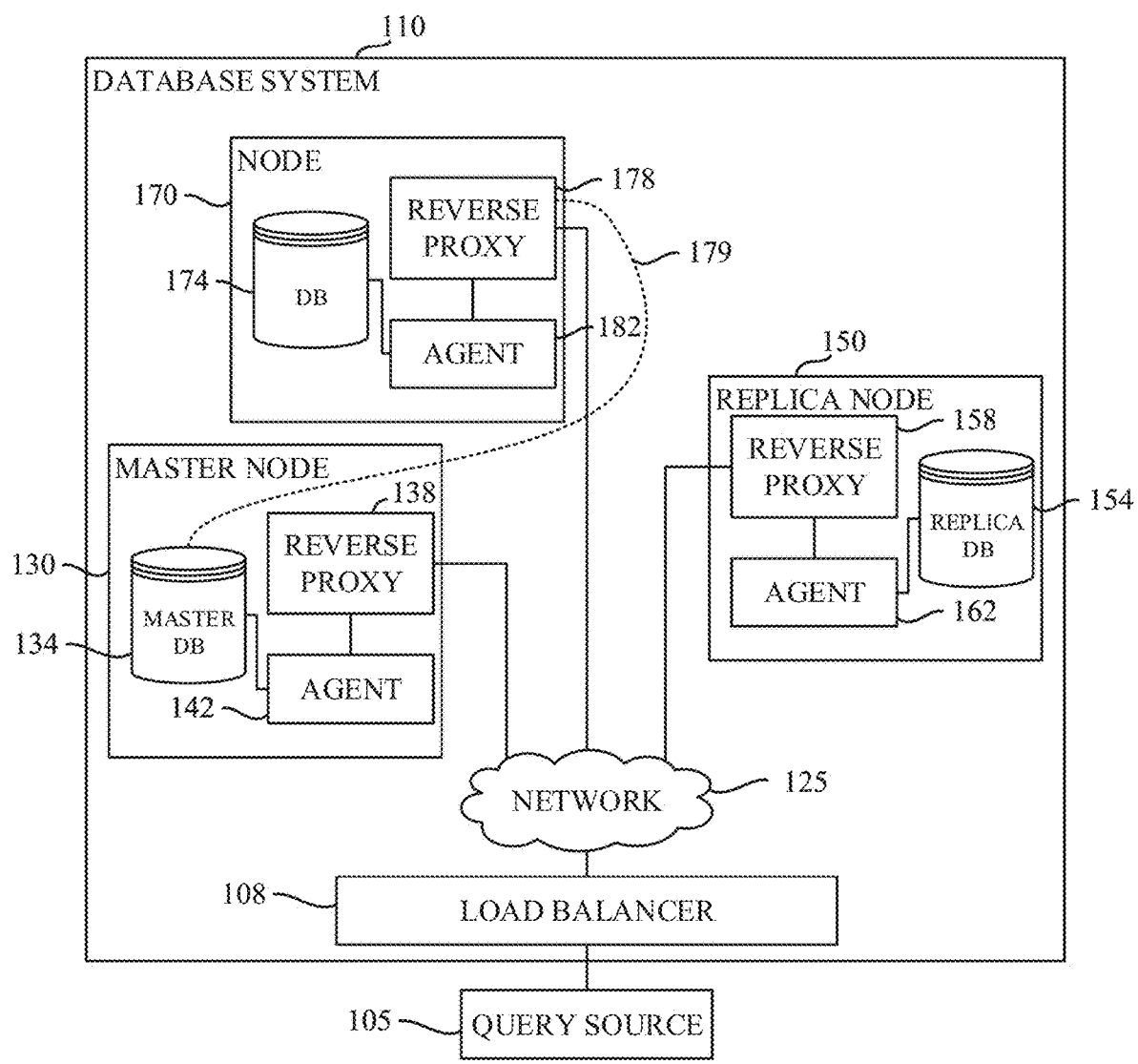
FIG. 1 is a block diagram of an example environment of use constructed in accordance with teachings of this disclosure in which a database system may be operated for automatic database failover in a master-replica replication configuration.

FIG. 1 is a block diagram of an example environment of use constructed in accordance with teachings of this disclosure in which a database system 110 may be operated for automatic database failover in a master-replica replication configuration. In the illustrated example of FIG. 1, the environment of use includes the database system 110 which receives a query from a query source 105 via a load balancer 108.

In the illustrated example of FIG. 1, the query source 105 represents any entity that may transmit a query to the database system 110. For example, the query source 105 may represent an application executed on a device (e.g., a mobile device, a desktop computer, a server, etc.) In examples disclosed herein, the query may be formatted using any type of query language such as, for example, a structured query language (SQL) format. While in the illustrated example of FIG. 1 a single query source 105 is shown, in practice, many different query sources may be utilized representing many different devices that may transmit queries to the database system. In some examples, the query transmitted by the query source is intended to write data to the database system 110. However, in some examples, the query is intended to retrieve data from the database system.

The example load balancer 108 of the illustrated example of FIG. 1 is implemented by hardware load balancer that routes incoming queries to a reverse proxy implemented by the example database system 110. In the illustrated example of FIG. 1, the example load balancer 108 is implemented as a component of the database system 110 but, in some examples, the load balancer 108 may be implemented outside of the database system 110. In examples disclosed herein, the load balancer 108 implements a round-robin load-balancing scheme to distribute incoming queries evenly among different reverse proxies implemented within the example database system 110. However, any other load-balancing approach may additionally or alternatively be used to distribute queries to the different reverse proxies implemented within the example database system 110.

The example database system 110 includes a network 125, and three nodes 130, 150, 170. In the illustrated example of FIG. 1, a first node is identified as a master node 130, and a second node is identified as a synchronous replica node 150. Synchronous replica node database is exactly the same as the master node database. A third node 170 is an asynchronous replica node. In examples disclosed herein, database transactions are handled at the master node 130, and are synchronously replicated to the replica node 150. Such transactions are asynchronously replicated to the node 170. In some examples, the third node 170 (e.g., the asynchronous replica node) might not contain all of the transactions from the master node replicated locally. Thus, in general, the database of the third node 170 might not include the same data as the master database node, but instead lags behind the master node and/or the synchronous node in terms of replicated transactions. In examples disclosed herein, such lag is minimal. In the event that the synchronous replica node encounters a failure, the third node 170 takes on the role of synchronous replica. In some examples, the database of the third node itself initiates the third node to automatically take over the synchronous replica role in case of a failure of the second node (e.g., the former synchronous replica node). In examples disclosed herein, the agent(s) monitor a status of the synchronous replica node, and initiate a repair operation in the event of a failure. In the illustrated example of FIG. 1, the example database system 110 includes three nodes 130, 150, 170, any number of nodes may additionally or alternatively be used such as for example, five nodes, 10 nodes, 100 nodes, etc.

The example network 125 of the illustrated example of FIG. 1 is a local area network (LAN). However, in some examples, other types of networks may additionally or alternatively be used such as, for example, a virtual private network (VPN), a wide area network (WAN), etc. In examples disclosed herein, the example network 125 is implemented as an Ethernet network. However, any other network type(s) and/or protocol(s) may additionally or alternatively be utilized to implement the example network 125 of FIG. 1.

The example nodes 130, 150, 170 include a database 134, 154, 174, a reverse proxy 138, 158, 178, and an agent 142, 162, 182. In examples disclosed herein, each of the nodes 130, 150, 170 are implemented using similar hardware, however in some examples the nodes may be implemented using different hardware.

The example database 134, 154, 174 may be any device for storing data such as, for example, flash memory, magnetic media, optical media, etc. The example database 134, 154, 174 of the illustrated example of FIG. 1 stores data to be accessed by the query source 105. However, the example database 134, 154, 174 may additionally or alternatively store any other information. Furthermore, the data stored in the example database 134, 154, 174 may be in any data format such as, for example, binary data, comma delimited data, tab delimited data, structured query language (SQL) structures, etc. While in the illustrated example the database 134, 154, 174 is illustrated as a single database per node, the database 134, 154, 174 may be implemented by multiple databases within a same node.

The example reverse proxy 138, 158, 178 of the illustrated example of FIG. 1 is implemented by a logic circuit such as, for example, a hardware processor. However, any other type of circuitry may additionally or alternatively be used such as, for example, one or more analog or digital circuit(s), logic circuits, programmable processor(s), Application Specific Integrated Circuit(s) (ASIC(s)), Programmable Logic Device(s) (PLD(s)), Field Programmable Logic Device(s) (FPLD(s)), Digital Signal Processor(s) (DSP(s)), etc. In examples disclosed herein, the reverse proxy is a proxy that accesses a resource (e.g., the database 134, 154, 174) on behalf of the query source 105. For example, the reverse proxy 138, 158, 178 relays a received query from the query source 105 to one of the databases 134, 154, 174 (e.g., the master database 134), and returns the result to the query source 105 as though the query had been executed at the node on which the reverse proxy 138, 158, 178 is implemented. Thus, in practice, the use of the reverse proxy(ies) hides the existence of the node(s) from the query source 105 and/or the load balancer 108.

The example agent 142, 162, 182 of the illustrated example of FIG. 1 is implemented by a logic circuit such as, for example, a hardware processor. However, any other type of circuitry may additionally or alternatively be used such as, for example, one or more analog or digital circuit(s), logic circuits, programmable processor(s), ASIC(s), PLD(s), FPLD(s), DSP(s), etc. The example agent 142, 162, 182 monitors operations of the nodes within the database system 110 and modifies a configuration of the node(s) in response to failures detected within the database system 110. In this manner, the example agent 142, 162, 182 ensures that any amount of down-time of the database system 110 is kept to a minimum. An example implementation of the example agent 142, 162, 182 is described below in connection with FIG. 2.

Figure 2:
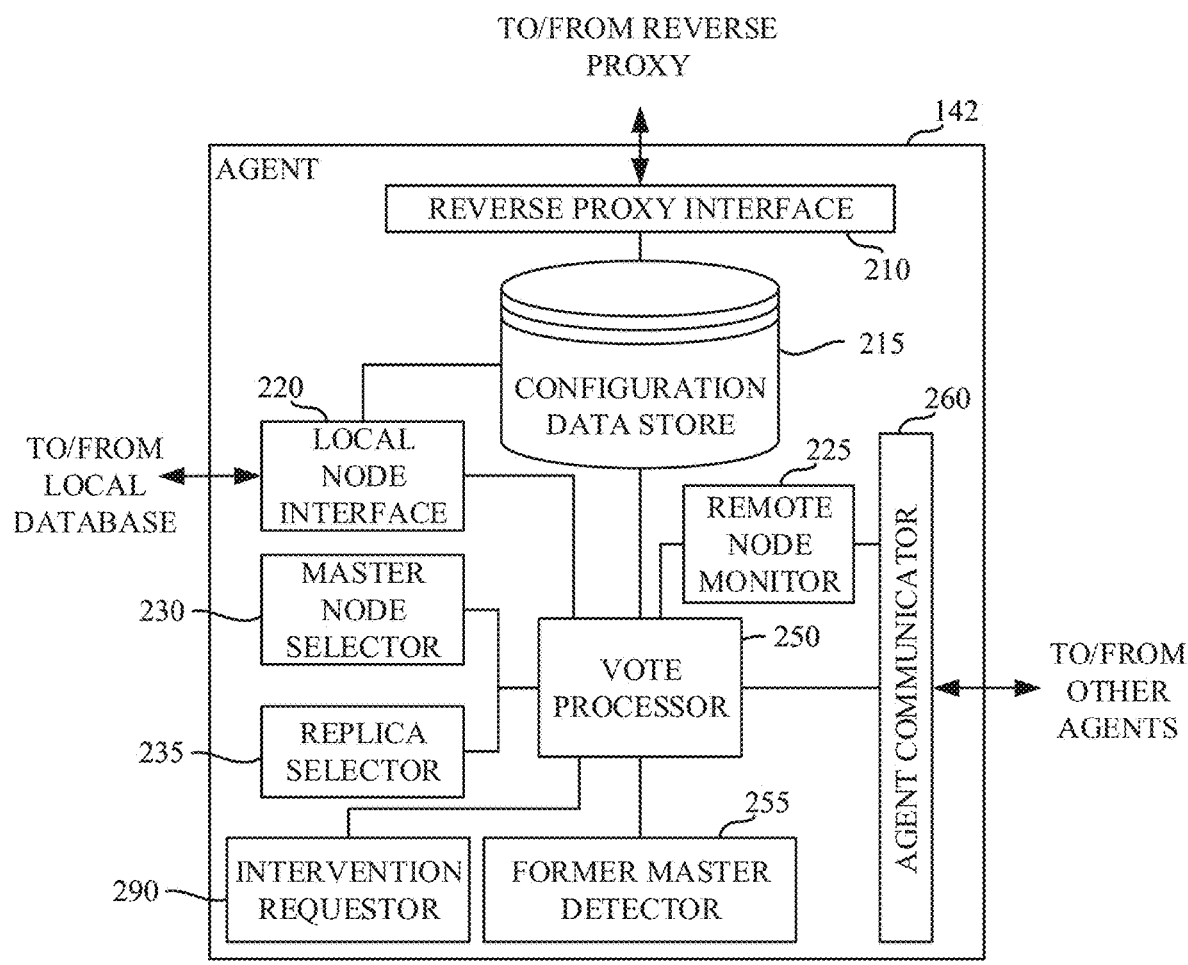
FIG. 2 is block diagram of an example agent implemented with the example database system of FIG. 1.

FIG. 2 is block diagram of an example agent 142 implemented with the example database system of FIG. 1. The example agent 142 of the illustrated example of FIG. 2 includes a reverse proxy interface 210, a configuration data store 215, a local node interface 220, a remote node monitor 225, a master node selector 230, a replica selector 235, a vote processor 250, a former master detector 255, an agent communicator 260, and an intervention requestor 290.

The example reverse proxy interface 210 of the illustrated example of FIG. 2 is implemented by a logic circuit such as, for example, a hardware processor. However, any other type of circuitry may additionally or alternatively be used such as, for example, one or more analog or digital circuit(s), logic circuits, programmable processor(s), Application Specific Integrated Circuit(s) (ASIC(s)), Programmable Logic Device(s) (PLD(s)), Field Programmable Logic Device(s) (FPLD(s)), Digital Signal Processor(s) (DSP(s)), etc. The example reverse proxy interface 210 configures the reverse proxy 138 such that incoming queries are relayed to the master node for processing. In some examples, the example reverse proxy interface 210 may with the example reverse proxy to execute a replica reset, thereby ensuring that the reverse proxy is pointed to the selected master node. In some examples, the example reverse proxy interface 210 interacts with the reverse proxy to stop the reverse proxy, repair the configuration of the reverse proxy, and then restart the reverse proxy.

The example configuration data store 215 of the illustrated example of FIG. 2 is implemented by any memory, storage device and/or storage disc for storing data such as, for example, flash memory, magnetic media, optical media, etc. Furthermore, the data stored in the configuration data store 215 may be in any data format such as, for example, binary data, comma delimited data, tab delimited data, structured query language (SQL) structures, etc. While in the illustrated example the configuration data store 215 is illustrated as a single element, the example configuration data store 215 and/or any other data storage elements described herein may be implemented by any number and/or type(s) of memories. In the illustrated example of FIG. 2, the configuration data store 215 stores configuration information for the node.

The example local node interface 220 of the illustrated example of FIG. 2 is implemented by a logic circuit such as, for example, a hardware processor. However, any other type of circuitry may additionally or alternatively be used such as, for example, one or more analog or digital circuit(s), logic circuits, programmable processor(s), ASIC(s), PLD(s), FPLD(s), DSP(s), etc. The example local node interface 220 the example local node interface 220 informs the database (e.g., the local database) whether that database is the master database and/or the replica database. In some examples, the local node interface 220 identifies which node(s) are the master and/or replica nodes to the local database. In some examples, the example local node interface 220 monitors the local database to detect a failure of the master node (e.g., when the agent 142 is operated at the node selected to be the master node).

The example remote node monitor 225 of the illustrated example of FIG. 2 is implemented by a logic circuit such as, for example, a hardware processor. However, any other type of circuitry may additionally or alternatively be used such as, for example, one or more analog or digital circuit(s), logic circuits, programmable processor(s), ASIC(s), PLD(s), FPLD(s), DSP(s), etc. The example remote node monitor 225 identifies nodes participating in the database system 110 by transmitting a request (e.g., a hypertext transfer protocol (HTTP) request, a representational state transfer (REST) request, etc.) to other nodes operating on the network 125, requesting that those other nodes identify themselves. In some examples, the request is broadcast to other nodes, thereby enabling any node on the network 125 to respond to such request. In some examples, when identifying themselves, the other nodes provide their present configuration information, if any.

In some examples, the example remote node monitor 225 queries the other nodes in the database system 110 (e.g., those nodes that identified themselves) for their configuration information via the agent communicator 260. In examples disclosed herein, the query is implemented using a representational state transfer (REST) request. However, any other approach to performing monitoring of a remote node may additionally or alternatively be used such as, for example, transmitting an Internet Control Message Protocol (ICMP) message (also referred to as a Ping message) to the remote node(s).

The example remote node monitor 225 awaits responses from each of the queried nodes. In some examples, the example remote node monitor 225 waits until all expected responses are received, or a threshold amount of time has elapsed before subsequent operations to be performed (e.g., vote processing). In examples disclosed herein, all expected responses are considered to be received when a number of responses received is equal to a total number of other nodes operated in the database system 110. In some examples, the threshold amount of time is fifteen seconds. However, any other threshold amount of time may additionally or alternatively be used.

The example master node selector 230 of the illustrated example of FIG. 2 is implemented by a logic circuit such as, for example, a hardware processor. However, any other type of circuitry may additionally or alternatively be used such as, for example, one or more analog or digital circuit(s), logic circuits, programmable processor(s), ASIC(s), PLD(s), FPLD(s), DSP(s), etc. The example master node selector 230 generates a vote for one of the nodes to become the master node. In examples disclosed herein, the master node is selected based on, for example, a latency (e.g., a communications latency) between the master node selector 230 and the other node. For example, the example master node selector 230 may identify latencies among all of the nodes participating in the example database system 110, and vote for the node having the lowest latency to become the master node. However, any other property may additionally or alternatively be used to vote for a master node. For example, an amount of processing power at each of the nodes, an amount of memory available at each of the nodes, a name of the node, etc. may be used to generate a vote for the master node. In some examples, a same selection algorithm is used across the different nodes in the database system 110, generally resulting in the different nodes selecting a same node to operate as the master node. In some examples, different nodes may be result in different selections due to, for example, different amounts of latency between nodes.

The example replica selector 235 of the illustrated example of FIG. 2 is implemented by a logic circuit such as, for example, a hardware processor. However, any other type of circuitry may additionally or alternatively be used such as, for example, one or more analog or digital circuit(s), logic circuits, programmable processor(s), ASIC(s), PLD(s), FPLD(s), DSP(s), etc. The example replica selector 235 generates a vote for one of the nodes to become the replica node. In examples disclosed herein, the replica node is selected based on, for example, the latency (e.g., a communications latency) between the replica selector 235 and the other node(s). For example, the example replica selector 235 may identify latencies among all of the other nodes participating in the in the example database system 110, and vote for the node having the second lowest latency to become the replica node (e.g., to allow the node with the lowest latency to operate as the master node). However, any other property may additionally or alternatively be used to vote for the replica node. For example, an amount of processing power at each of the nodes, an amount of memory available at each of the nodes, a name of the node, which node is voted to become the master node, etc. In some examples, the vote for the replica node may be based on the latency between the node(s) and the node selected as the master node. That is, selecting a replica node that has a lowest amount of latency to the master node ensures that the database system 110 will promptly respond to requests when operating in the synchronous mode (e.g. where a replica node must complete a corresponding operation, such as a write operation, before the master node is allowed to provide a response to an incoming query).

The example vote processor 250 of the illustrated example of FIG. 2 is implemented by a logic circuit such as, for example, a hardware processor. However, any other type of circuitry may additionally or alternatively be used such as, for example, one or more analog or digital circuit(s), logic circuits, programmable processor(s), ASIC(s), PLD(s), FPLD(s), DSP(s), etc. The example vote processor 250 collects the votes from the master node selector 230, the replica selector 235, and the master node selectors and replica selectors of other nodes identified by the remote node monitor in block 310. The example vote processor 250 determines whether the votes resulted in a majority selection of a master node, replica node, and/or overall configuration. In examples disclosed herein, the majority is identified when more than 50% of the participating nodes have voted for a single master node, replica node, configuration, etc. However, any other type of voting scheme/system may additionally or alternatively be used such as, for example, the node receiving the most number of votes may be selected (e.g., as the master node or the replica node), the node receiving at least 70% of the votes may be selected, etc. In some examples, a selection is only allowed to be made when a quorum of votes is present. That is, the selection may only be made when a minimum vote threshold is met (e.g., when at least 50% of the nodes participating in the database system have provided a vote). Using the selected master node, the selected replica node, and/or, more generally, a selected configuration, the example vote processor 250 stores a configuration identifying the selected master node and the selected replica node(s) in the configuration data store 215.

The example former master detector 255 of the illustrated example of FIG. 2 is implemented by a logic circuit such as, for example, a hardware processor. However, any other type of circuitry may additionally or alternatively be used such as, for example, one or more analog or digital circuit(s), logic circuits, programmable processor(s), ASIC(s), PLD(s), FPLD(s), DSP(s), etc.). In some examples, a recovery from a failure may be made quickly enough that other nodes had not yet accounted for such a failure. However, such a configuration update is possible. Thus, to account for such a situation, the example vote processor 250 requests votes from other nodes identifying the master node, and subsequently identifies a master node of the database system 110. The example former master detector 255 compares a hostname of the node on which the former master detector 255 (and/or agent 142) is operated against a hostname of the identified master node. However, any other information may additionally or alternatively be compared to determine whether the node on which the former master detector 255 is operated is the master node. In this manner, an appropriate recovery process can be executed to ensure that a node recovering from a failure is properly restored.

The example agent communicator 260 of the illustrated example of FIG. 2 is implemented by a logic circuit such as, for example, a hardware processor. However, any other type of circuitry may additionally or alternatively be used such as, for example, one or more analog or digital circuit(s), logic circuits, programmable processor(s), ASIC(s), PLD(s), FPLD(s), DSP(s), etc. The example agent communicator 260 enables components of the agent 142 to communicate with other agents in the database system 110. In some examples, the agent communicator 260 provides responses to inquiries from other agents in the database system 110. For example, in response to a request for a vote and/or configuration information, the example agent communicator may interact with the relevant component of the agent (e.g., the example master node selector 230, the example replica selector 235, the example configuration data store 215, etc.) to provide a response to the requesting agent.

The example intervention requestor 290 of the illustrated example of FIG. 2 is implemented by a logic circuit such as, for example, a hardware processor. However, any other type of circuitry may additionally or alternatively be used such as, for example, one or more analog or digital circuit(s), logic circuits, programmable processor(s), ASIC(s), PLD(s), FPLD(s), DSP(s), etc. The example intervention requestor 290 requests a manual failover and/or manual intervention by an administrator of the database system 110. In examples disclosed herein, the manual failover and/or manual intervention are requested by displaying a prompt to the administrator. However, any other approach to requesting a manual failover and/or manual intervention may additionally or alternatively be used such as, for example, transmitting a message (e.g., an email message, a short message service (SMS) message, etc.) to the administrator.

While an example manner of implementing the example agent 142 of FIG. 1 is illustrated in FIG. 2, one or more of the elements, processes and/or devices illustrated in FIG. 2 may be combined, divided, re-arranged, omitted, eliminated and/or implemented in any other way. Further, the example reverse proxy interface 210, the example configuration data store 215, the example local node interface 220, the example remote node monitor 225, the example master node selector 230, the example replica selector 235, the example vote processor 250, the example former master detector 255, the example agent communicator 260, the example intervention requestor 290, and/or, more generally, the example agent 142 of FIGS. 1 and/or 2 may be implemented by hardware, software, firmware and/or any combination of hardware, software and/or firmware. Thus, for example, any of the example reverse proxy interface 210, the example configuration data store 215, the example local node interface 220, the example remote node monitor 225, the example master node selector 230, the example replica selector 235, the example vote processor 250, the example former master detector 255, the example agent communicator 260, the example intervention requestor 290, and/or, more generally, the example agent 142 of FIGS. 1 and/or 2 could be implemented by one or more analog or digital circuit(s), logic circuits, programmable processor(s), programmable controller(s), graphics processing unit(s) (GPU(s)), digital signal processor(s) (DSP(s)), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example reverse proxy interface 210, the example configuration data store 215, the example local node interface 220, the example remote node monitor 225, the example master node selector 230, the example replica selector 235, the example vote processor 250, the example former master detector 255, the example agent communicator 260, the example intervention requestor 290, and/or, more generally, the example agent 142 of FIGS. 1 and/or 2 is/are hereby expressly defined to include a non-transitory computer readable storage device or storage disk such as a memory, a digital versatile disk (DVD), a compact disk (CD), a Blu-ray disk, etc. including the software and/or firmware. Further still, the example agent 142 of FIGS. 1 and/or 2 may include one or more elements, processes and/or devices in addition to, or instead of, those illustrated in FIG. 2, and/or may include more than one of any or all of the illustrated elements, processes and devices. As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

Flowcharts representative of example hardware logic, machine readable instructions, hardware implemented state machines, and/or any combination thereof for implementing the example agent 142 and/or, more generally, the example node 130, 150, 170 of FIGS. 1 and/or 2 are shown in FIGS. 3, 4, 5, 6, 7, and/or 8. The machine readable instructions may be a program or portion of a program for execution by a computer processor such as the processor 912 shown in the example processor platform 900 discussed below in connection with FIG. 9. The program may be embodied in software stored on a non-transitory computer readable storage medium such as a CD-ROM, a floppy disk, a hard drive, a DVD, a Blu-ray disk, or a memory associated with the processor 912, but the entire program and/or parts thereof could alternatively be executed by a device other than the processor 912 and/or embodied in firmware or dedicated hardware. Further, although the example program is described with reference to the flowcharts illustrated in FIGS. 3, 4, 5, 6, 7, and/or 8, many other methods of implementing the example agent 142, 162, 182 may alternatively be used. For example, the order of execution of the blocks may be changed, and/or some of the blocks described may be changed, eliminated, or combined. Additionally or alternatively, any or all of the blocks may be implemented by one or more hardware circuits (e.g., discrete and/or integrated analog and/or digital circuitry, an FPGA, an ASIC, a comparator, an operational-amplifier (op-amp), a logic circuit, etc.) structured to perform the corresponding operation without executing software or firmware.

As mentioned above, the example processes of FIGS. 3, 4, 5, 6, 7, and/or 8 may be implemented using executable instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc. may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, or (7) A with B and C.

Figure 3:
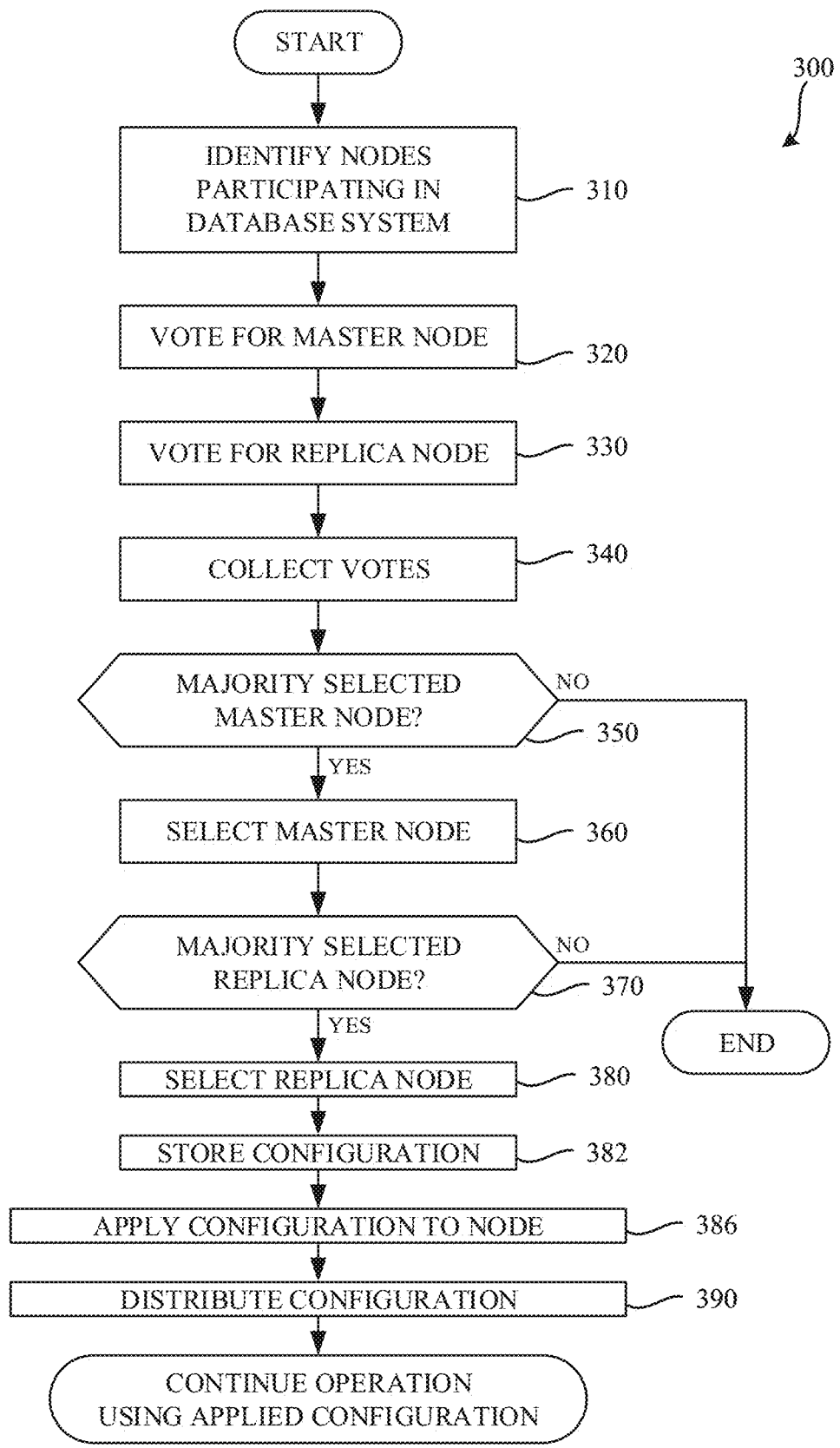
FIG. 3 is a flowchart representative of machine-readable instructions which may be executed to implement the example agent of FIGS. 1 and/or 2 to initialize a node.

FIG. 3 is a flowchart representative of machine-readable instructions 300 which may be executed to implement the example agent of FIGS. 1 and/or 2 to initialize a node. The example program 300 of FIG. 3 begins at block 310, where the example remote node monitor 225 identifies nodes participating in the database system 110. (Block 310). In examples disclosed herein, the example remote node monitor 225 identifies nodes participating in the database system 110 by transmitting a request (e.g., a hypertext transfer protocol (HTTP) request, a representational state transfer (REST) request, etc.) to other nodes operating on the network 125, requesting that those other nodes identify themselves. In some examples, the request is broadcast to other nodes, thereby enabling any node to respond to such request. In some examples, when identifying themselves, the other nodes provide their present configuration information, if any.

The example master node selector 230 generates a vote for one of the nodes to become the master node. (Block 320). In examples disclosed herein, the master node is selected based on, for example, a latency (e.g., a communications latency) between the master node selector 230 and the other node. For example, the example master node selector 230 may identify latencies among all of the nodes participating in the example database system 110, and vote for the node having the lowest latency to become the master node. However, any other property may additionally or alternatively be used to vote for a master node. For example, an amount of processing power at each of the nodes, an amount of memory available at each of the nodes, a name of the node, etc. may be used to generate a vote for the master node. In some examples, a same selection algorithm is used across the different nodes in the database system 110, generally resulting in the different nodes selecting a same node to operate as the master node. In some examples, different nodes may be result in different selections due to, for example, different amounts of latency between nodes.

The example replica selector 235 generates a vote for one of the nodes to become the replica node. (Block 330). In examples disclosed herein, the synchronous replica node is selected based on, for example, the latency between the replica selector 235 and the other node(s). For example, the example replica selector 235 may identify latencies among all of the other nodes participating in the in the example database system 110, and vote for the node having the second lowest latency to become the synchronous replica node (e.g., to allow the node with the lowest latency to operate as the master node). However, any other property may additionally or alternatively be used to vote for the synchronous replica node. For example, an amount of processing power at each of the nodes, an amount of memory available at each of the nodes, a name of the node, which node is voted to become the master node, etc. In some examples, the vote for the synchronous replica node may be based on the latency between the node(s) and the node selected as the master node. That is, selecting a replica node that has a lowest amount of latency to the master node ensures that the database system 110 will promptly respond to requests when operating in the synchronous mode (e.g. where a replica node must complete a corresponding operation, such as a write operation, before the master node is allowed to provide a response to an incoming query).

The example vote processor 250 collects the votes from the master node selector 230, the replica selector 235, and the master node selectors and replica selectors of other nodes identified by the remote node monitor in block 310. (Block 340). The example vote processor 250 determines whether the votes resulted in a majority selection of a master node. In examples disclosed herein, the majority is identified when more than 50% of the participating nodes have voted for a single master node. However, any other type of voting scheme/system may additionally or alternatively be used such as, for example, the node receiving the most number of votes for becoming a master node may be selected, the node receiving at least 70% of the votes may be selected, etc. In some examples, a master node is only allowed to be selected when a quorum of votes is present. That is, the master node may only be selected when a minimum vote threshold is met (e.g., when at least 50% of the nodes participating in the database system have provided a vote). If the example vote processor 250 determines that a master node cannot be selected (e.g., block 350 returns a result of NO), the example process 300 of the illustrated example of FIG. 3 terminates. If the example vote processor 250 determines that the master node can be selected (e.g., block 350 returns a result of YES), the example vote processor 250 selects a master node based on the votes. (Block 360).

The example vote processor 250 determines whether the votes resulted in a majority selection of the synchronous replica node. (Block 370). In examples disclosed herein, the same voting/selection scheme as was used to select the master node is used for selection of the synchronous replica node. However, in some examples, a different voting/selection scheme may be used. For example, the synchronous replica node is identified when at least than 50% of the participating nodes have voted for a single replica node. However, any other type of voting scheme/system may additionally or alternatively be used such as, for example, the node receiving the most number of votes for becoming the synchronous replica node, the node receiving at least 70% of the votes to become the synchronous replica node, etc. In some examples, the synchronous replica node is only allowed to be selected when a quorum of votes is present. That is, the synchronous replica node may only be selected when a minimum vote threshold is met (e.g., when at least 50% of the nodes participating in the database system have provided a vote). In some examples, multiple synchronous replica nodes may be selected. If the example vote processor 250 determines that a synchronous replica node cannot be selected (e.g., block 350 returns a result of NO), the example process 300 of the illustrated example of FIG. 3 terminates. If the example vote processor 250 determines that the replica node can be selected (e.g., block 370 returns a result of YES), the example vote processor 250 selects the replica node. (Block 380).

The example vote processor 250 stores a configuration identifying the selected master node and the selected replica node(s) in the configuration data store 215. (Block 382). The example reverse proxy interface 210 and the local node interface 220 then apply the configuration stored in the example configuration data store 215 to the node. (Block 386). In examples disclosed herein, the example local node interface 220 informs the database (e.g., the local database) whether that database is the master database and/or the replica database. In some examples, the local node interface 220 identifies which node(s) are the master and/or replica nodes to the local database. The example reverse proxy interface 210 configures the reverse proxy 138 such that incoming queries are relayed to the master node for processing. The example vote processor 250 then distributes the configuration stored in the configuration data store 215 to the other nodes operating in the database system 110. (Block 390). In examples disclosed herein, the configuration is distributed via the agent communicator 260. The example process 300 of the illustrated example of FIG. 3 then completes, and operations of the node are continued using the applied configuration.

Figure 4:
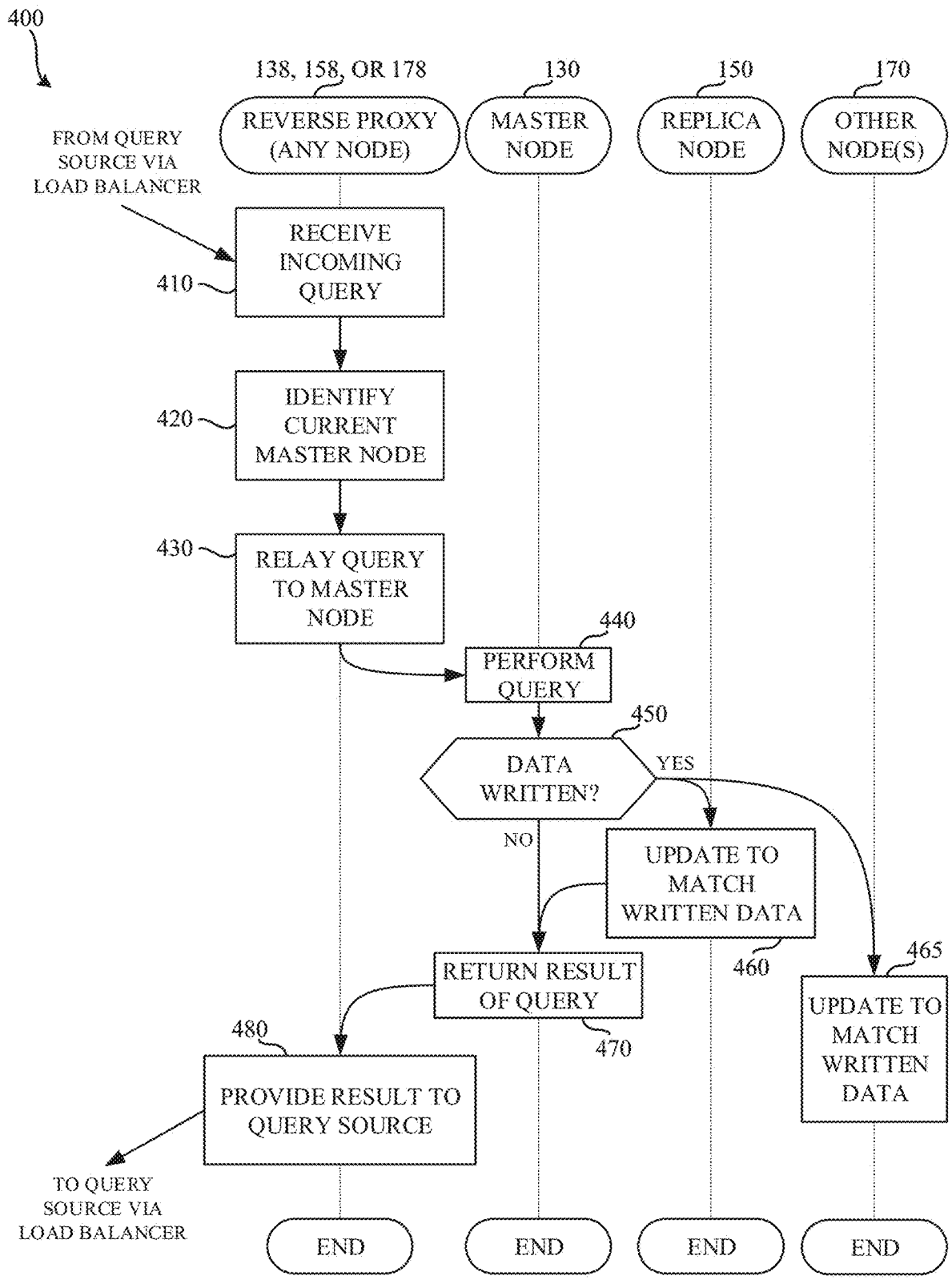
FIG. 4 is a flowchart representative of machine-readable instructions which may be executed to implement the example reverse proxy of FIG. 1, the example master node of FIG. 1, the example replica node of FIG. 1, and/or the example other node of FIG. 1 to handle an incoming query from the query source of FIG. 1.

FIG. 4 is a flowchart representative of machine-readable instructions 400 which may be executed to implement the example reverse proxy 138, 158, 178 of FIG. 1, the example master node 130 of FIG. 1, the example synchronous replica node 150 of FIG. 1, and/or the example replica node 170 of FIG. 1 to handle an incoming query from the query source 105 of FIG. 1. The example process 400 of the illustrated example of FIG. 4 begins when the example load balancer 108 receives a query from the query source 105, and selects a node to which the query will be transmitted. In examples disclosed herein, such a node may be the master node 130, the replica node 150, or the node 170. The reverse proxy 138, 158, 178 (implemented at the selected node) receives the incoming query from the load balancer 108. (Block 410). The example reverse proxy 138, 158, 178 identifies the current master node. (Block 420). In examples disclosed herein, the reverse proxy 138, 158, 178 utilizes a configuration provided to the reverse proxy (e.g., by the agent) to identify the current master node. In examples disclosed herein, the agent refreshes the reverse proxy configuration to represent the most recent configuration. Such an approach is disclosed in connection with block 382 of FIG. 3, in which the agent applies the most recent database state (which is the Master and which are the Replicas) in the reverse proxy configuration. The example reverse proxy 138, 158, 178 relays the query to the master node. (Block 430). Referring to the illustrated example of FIG. 1, if, for example, the load balancer 108 had directed the incoming query to the reverse proxy 178 operated on the node 170, the reverse proxy 178 relays the query to the master node 130 via communication path 179.

In some examples, the reverse proxy 138, 158, 178 may not be able to identify a master node and/or may determine that the master node is undergoing a failure. In such a scenario, the example reverse proxy 138, 158, 178, selects any other node and relays the query to the selected node. Because the selected node is not the master node, the query will be treated as a read-only query, and will not allow new data to be stored in the database to which the query is transmitted. Such an approach enables data to be retrieved from the database system 110 during a period of reduced functionality (e.g., while a new master node is being configured).

Returning to FIG. 4, the master database 134 of the example master node 130 executes the query. (Block 440). The example master database 134 then determines whether data was written as part of execution of the query. (Block 450). If data was written (e.g., block 450 returns a result of YES), the example database 134 operated at the example master node 130 provides the written data to the synchronous replica database 154 operated at the example replica node 150. The example replica database 154 operated at the example replica node 150 updates the database 154 to match the data written to the example master database 134. (Block 460). The example replica database 154 confirms, to the example master database 134, completion of the write operation of block 460. The example master database 134 of the example master node 130 then returns a result of the query to the reverse proxy 138, 158, 178. (Block 470). The example reverse proxy 138, 158, 178 provides the received results to the query source via the load balancer 108. (Block 480).

Returning to block 450, if data was written (e.g., block 450 returns a result of YES), in some examples, the example master database 134 provides the data to the asynchronous replica node 170 to enable the database 174 operated at the asynchronous replica node 170 to perform an update. (Block 465). In examples disclosed herein, the master database 134 does not wait for completion of the write operation at the database 174 (e.g., unlike when data is transmitted to the replica database 154, where the master database waits for the completion of the write operation at the replica database 154). Waiting for the completion of the write operation of the replica database 154 ensures that the replica database 154 remains in sync with the master database 134. Thus, in the event of a failure of the master database 134, the replica database 154 may assume its position as the master node, thereby ensuring minimal downtime of the example database system 110.

Returning again to block 450, if no data was written (e.g., block 450 returns a result of NO), no updates need be performed at the replica database 134 and/or other database 174. Thus, control proceeds to block 470 where the example master database 130 returns a result of the query to the reverse proxy 138, 158, 178.

Figure 5:
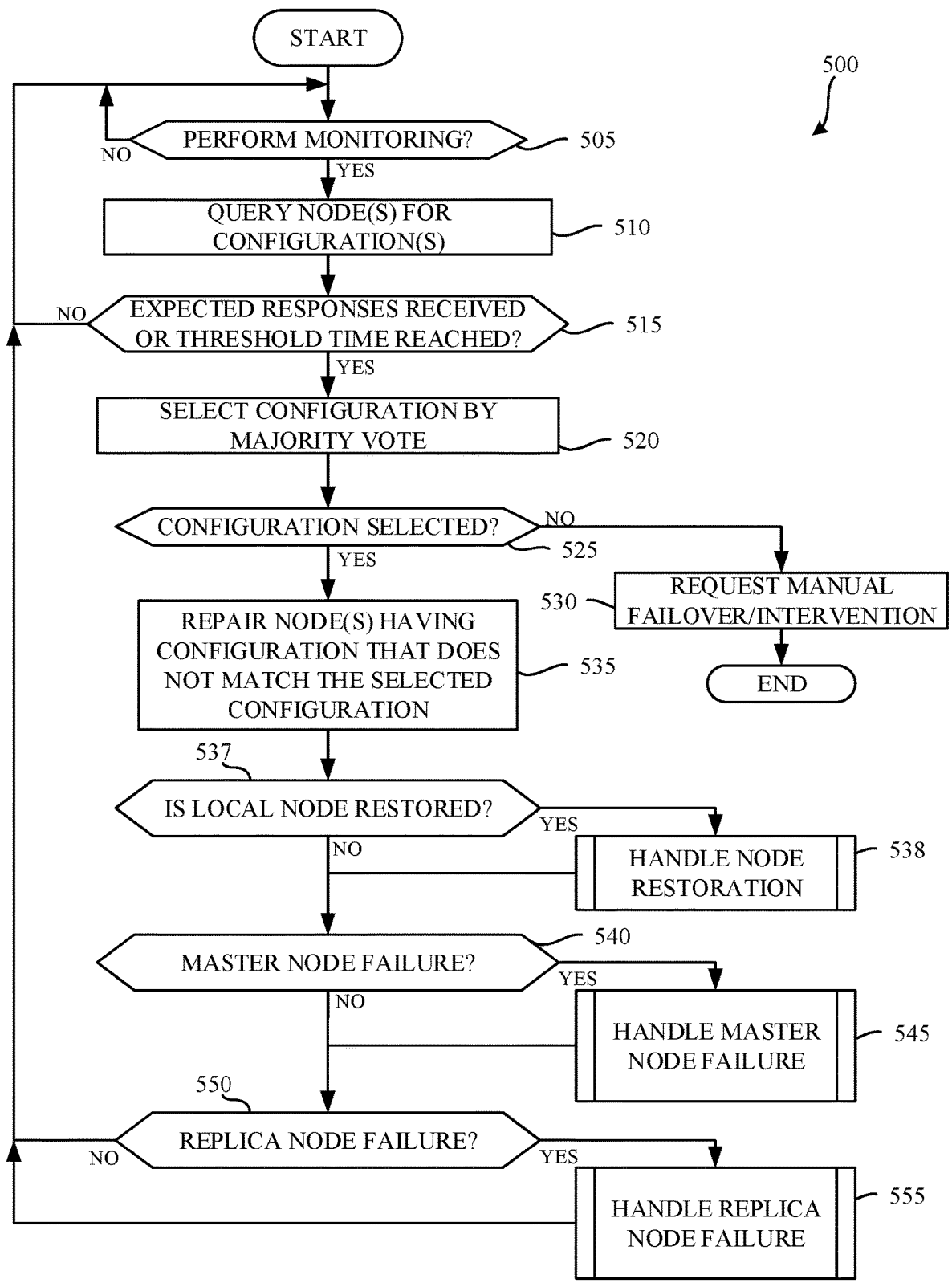
FIG. 5 is a flowchart representative of machine-readable instructions which may be executed to implement the example agent of FIGS. 1 and/or 2 to perform monitoring.

FIG. 5 is a flowchart representative of machine-readable instructions which may be executed to implement the example agent 142, 162, 182 of FIGS. 1 and/or 2 to perform monitoring. In examples disclosed herein, the agent 142, 162, 182 is to continually monitor other nodes in the example database system 110 to, for example, identify a failure of the master node, identify failure of a replica node, identify a new node joined to the database system (e.g., a node returning from a failure), etc. the example process 500 the illustrated example of FIG. 5 begins when the example vote processor 250 of the example agent 142 determines whether to perform monitoring. (Block 505). In examples disclosed herein, monitoring is performed on a periodic basis such as, for example, every minute. However, monitoring may be performed with any other frequency (e.g., once every ten minutes, once every hour, etc.). Moreover, monitoring may be performed in an aperiodic fashion. If the processor 250 determines that monitoring is not yet to be performed (e.g., block 505 returns a result of NO), the example vote processor 250 waits until monitoring is to be performed (e.g., until block 505 returns a result of YES).

In response to determining that monitoring is to be performed (e.g., block 505 returns a result of YES), the example remote node monitor 225 queries the other nodes in the database system 110 for their configuration information via the agent communicator 260. (Block 510). In examples disclosed herein, the query is implemented using a representational state transfer (REST) request. However, any other approach to performing monitoring of a remote node may additionally or alternatively be used such as, for example, transmitting an Internet Control Message Protocol (ICMP) message (also referred to as a Ping message) to the remote node(s).

The example remote node monitor 225 awaits responses from each of the queried nodes. The example remote node monitor 225 waits until all expected responses are received, or a threshold amount of time has elapsed. (Block 515). All expected responses are considered to be received when a number of responses received is equal to a total number of other nodes operated in the database system 110. In some examples, the threshold amount of time is fifteen seconds. However, any other threshold amount of time may additionally or alternatively be used. Upon receiving all of the expected responses, or the threshold amount of time being reached (e.g., block 515 returning result of YES), the example vote processor 250 analyzes the received configuration responses, treating each of those responses as a vote for a particular configuration. If the example remote node monitor 225 determines that the threshold amount of time has elapsed without a threshold number of configurations (sometimes referred to as a quorum) being received (e.g., block 515 returning a result of NO), the example process continues to block 505.

The example vote processor 250 attempts to select a configuration that received a majority vote. (Block 520). In examples disclosed herein, the majority is identified when at least 50% of the received configurations identify a same configuration. However, any other approach to identifying majority may additionally or alternatively be used. Moreover, in some examples, a quorum may be required to ensure that a threshold number of nodes have responded with their configurations. The example vote processor 250 determines whether a single configuration can be selected. (Block 525). If no configuration can be selected (e.g., block 525 returns a result of NO), the example intervention requester 290 requests a manual failover and/or manual intervention. (Block 530). In examples disclosed herein, the manual failover and/or manual intervention are requested by displaying a prompt to an administrator of the database system 110. However, any other approach to requesting a manual failover and/or manual intervention may additionally or alternatively be used such as, for example, transmitting a message (e.g., an email message, a short message service (SMS) message, etc.) to an administrator of the database system 110.

If the single configuration is selected (e.g., block 525 returns a result of YES), the example vote processor communicates with any nodes having configuration that does not match the selected configuration to repair those nodes. (Block 535). In this manner, nodes that may have become de-synchronized from the configuration of the example database system 110 may be repaired.

The example local node interface 220 determines whether the local node has recovered from a failure (e.g., a local failure). (Block 537). In examples disclosed herein, the example local node interface 220 determines whether the local node has recovered from a failure by inspecting a log of the local database and/or, more generally, of the local node. If the local node interface determines that the local node has recovered from a failure, (e.g., block 537 returns a result of YES), the example agent handles the node restoration (Block 538). An example approach to handling the node restoration is described below in connection with FIG. 8. If no local node failure has been identified (e.g., block 537 returns a result of NO), or upon handling of the local node restoration (e.g., upon completion of block 538), control proceeds to block 540, where the example remote node monitor 225 determines whether a master node failure has been detected. (Block 540).

In examples disclosed herein, the remote node monitor 225 detects the master node failure when the agent 142 of the example master node 130 does not provide a configuration response (e.g., a response in connection with the request of block 510). However, any other approach to determining whether the master node has failed may additionally or alternatively be used. For example, the remote node monitor may transmit a dummy query to the database 134 of the master node 130 and review a received response as an indication of whether the master node has encountered a failure. If the example remote node monitor 225 identifies that the master node has encountered a failure (e.g., block 540 returns a result of YES), control proceeds to block 545 where the example remote node monitor 225 handles the master node failure. (Block 545). An example approach to handling the failure of the master node is described below in connection with FIG. 6.

If no master node failure has been detected (e.g., block 540 returns a result of NO), or upon handling of the master node failure (e.g., upon completion of block 545), the example remote node monitor 225 determines whether a synchronous replica node failure has been detected. (Block 550). In examples disclosed herein, the remote node monitor 225 detects a replica node failure when the agent 162 of the example replica node 150 does not provide a configuration response (e.g., a response in connection with the request of block 510). However, any other approach to determining whether the replica node has failed may additionally or alternatively be used. For example, the remote node monitor 225 may transmit a dummy query to the database 154 of the replica node 150 and review a received response as a proxy for identifying whether the replica node has encountered a failure. If the example remote node monitor 225 identifies that the replica node has encountered a failure (e.g., block 540 returns a result of YES), control proceeds to block 555 where the example agent handles the replica node failure. (Block 555). An example approach to handling the failure of the replica node is described below in connection with FIG. 7.

If no synchronous replica node failure has been detected (e.g., block 550 returns a result of NO), or upon handling of the replica node failure (e.g., upon completion of block 555), control proceeds to block 505, where the example process of FIG. 5 is repeated until a failure requiring manual failover and/or intervention occurs (and/or the process is terminated by, for example, a database administrator).

Figure 6:
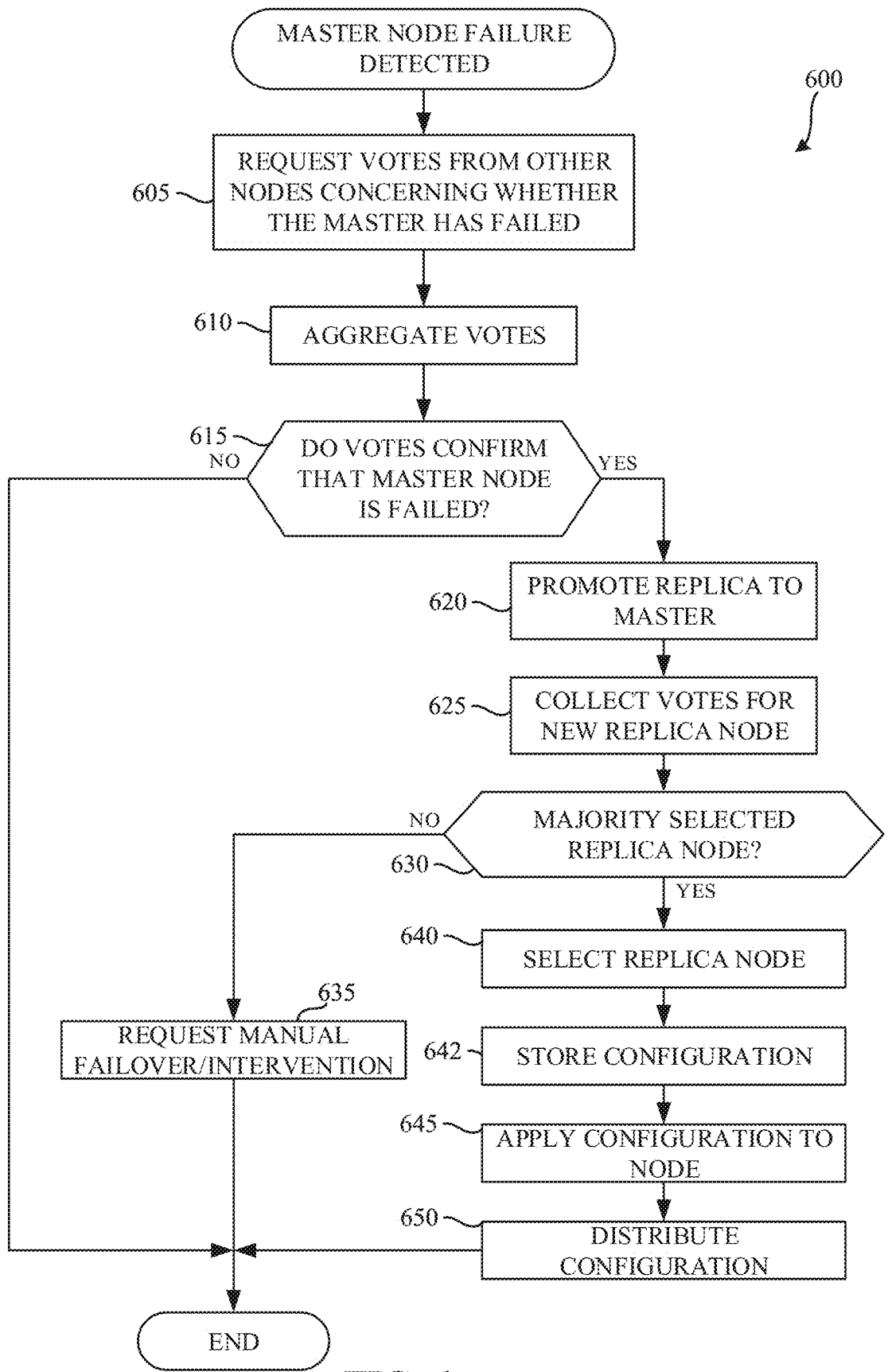
FIG. 6 is a flowchart representative of machine-readable instructions which may be executed to implement the example agent of FIGS. 1 and/or 2 to handle a failure of the master node.

FIG. 6 is a flowchart representative of machine-readable instructions 600 which may be executed to implement the example agent of FIGS. 1 and/or 2 to handle a failure of the master node. In examples disclosed herein, the example process 600 represents an example implementation of block 545 of FIG. 5. The example process 600 of FIG. 6 begins when the example remote node monitor 225 and/or the example local node interface 220 detect a failure of the master node. (see block 540 of FIG. 5). In examples where the agent is implemented at the master node, the example local node interface 220 interfaces with the example master database 134 to detect the failure. In contrast, in examples where the agent is implemented at a node other than the master node (e.g., at the replica node 150, at the node 170), the example remote node monitor 225 monitors the master database 134 executed at the master node 130. However, in some examples, the remote node monitor 225 may be used to monitor the master node even when the remote node monitor is implemented at the master node.

Upon detection of a failure of the master node, the example vote processor 250 requests votes from other nodes concerning whether they believe the master to be failed as well. (Block 605). In some examples, a momentary loss of connectivity may have been detected, resulting in a false identification of a failure of the master node. To ensure that false identifications of a failure do not inadvertently result in changes to the database system being applied (e.g., a new master node being selected), the example vote processor 250 requests votes from other nodes concerning whether those other nodes believe the master node to be failed as well. In examples disclosed herein, the votes are requested by transmitting a representational state transfer (REST) request to those other nodes requesting a vote. Votes are then provided back to the requestor via a response to the REST request. However, any other approach for soliciting votes may additionally or alternatively be used.

Upon receiving votes in response to the request for the votes, the example vote processor 250 aggregates the received votes. (Block 610). The example vote processor determines whether the votes confirm that the master node has failed. (Block 615). In examples disclosed herein, the master node is considered to have failed when a threshold number of votes confirming the failure are received. In examples disclosed herein, the threshold represents 50% of the received votes. However, in some examples, additional thresholds may additionally or alternatively be used to ensure, for example, that a minimum number of votes have been received.

If the example vote processor 250 determines that the votes confirm that the master node has failed e.g. block 615 returns a result of yes, the example vote processor 250 communicates with the agent of the replica node e.g. the agent 162 of FIG. 1 to instruct the agent of the synchronous replica node to promote the replica database e.g. database 154 of FIG. 1 to become the master database. (Block 620). Because queries that are transmitted to the master database, while operating in synchronous mode, are not allowed to be completed until the replica node has indicated that the changes, if any, have also been made at the replica database, the replica database 154 is constantly in a state of readiness with respect to being promoted to the master node. The example vote processor 250 then collects votes for which node will assume the role of the synchronous replica node. (Block 625). In examples disclosed herein, such votes are requested by transmitting a representational state transfer (REST) request to those other nodes requesting a vote. Votes are then provided back to the requestor via a response to the REST request. However, any other approach for soliciting votes may additionally or alternatively be used.

The example vote processor 250 determines whether the votes resulted in a majority selection of the replica node. (Block 630). In examples disclosed herein, the replica node is selected when at least than 50% of the participating nodes have voted for a single replica node. However, any other type of voting scheme/system may additionally or alternatively be used such as, for example, selecting the node receiving the most number of votes to become the replica node, selecting the node receiving at least 70% of the votes to become the replica node, etc. In some examples, the replica node is only allowed to be selected when a quorum of votes is present. That is, the replica node may only be selected when a minimum vote threshold is met (e.g., when at least 50% of the nodes participating in the database system have provided a vote).

If the example vote processor 250 determines that the replica node cannot be selected (e.g., block 630 returns a result of NO), the example intervention requester 290 requests a manual failover and/or manual intervention. (Block 635). In examples disclosed herein, the manual failover and/or manual intervention are requested by displaying a prompt to an administrator of the database system 110. However, any other approach to requesting a manual failover and/or manual intervention may additionally or alternatively be used such as, for example, transmitting a message (e.g., an email message, a short message service (SMS) message, etc.) to an administrator of the database system 110.

If the example vote processor 250 determines that the replica node can be selected (e.g., block 630 returns a result of YES), the example vote processor 250 selects the replica node based on the received votes. (Block 640). In examples disclosed herein, a single replica node is selected. However, in some examples, multiple replica nodes may be selected.

Upon selecting a replica node, the example vote processor 250 updates the configuration stored in the configuration data store 215 to identify the new selected replica node. (Block 642). The example reverse proxy interface 210 and the local node interface 220 then apply the configuration stored in the example configuration data store 215 to the node. (Block 645). In examples disclosed herein, the example local node interface 220 identifies, to the database of the node on which the agent 142 is operated, whether that database is the master database and, an identification of which node(s) are the replica node(s). The example reverse proxy interface 210 configures the reverse proxy 138 such that incoming queries are transmitted to the new master node (formerly the replica node) for processing.

The example vote processor 250 distributes the configuration stored in the configuration data store 215 to the other nodes operating in the database system 110. (Block 650). In examples disclosed herein, the configuration is distributed via the agent communicator 260, and is then applied to the other nodes in the database system 110. In this manner, the other nodes in the database system can become updated to, for example, operate as a replica node (if selected as such) and/or forward incoming queries to the appropriate master node. The example process 600 of the illustrated example of FIG. 6 then completes, and control returns to block 550 of FIG. 5.

Figure 7:
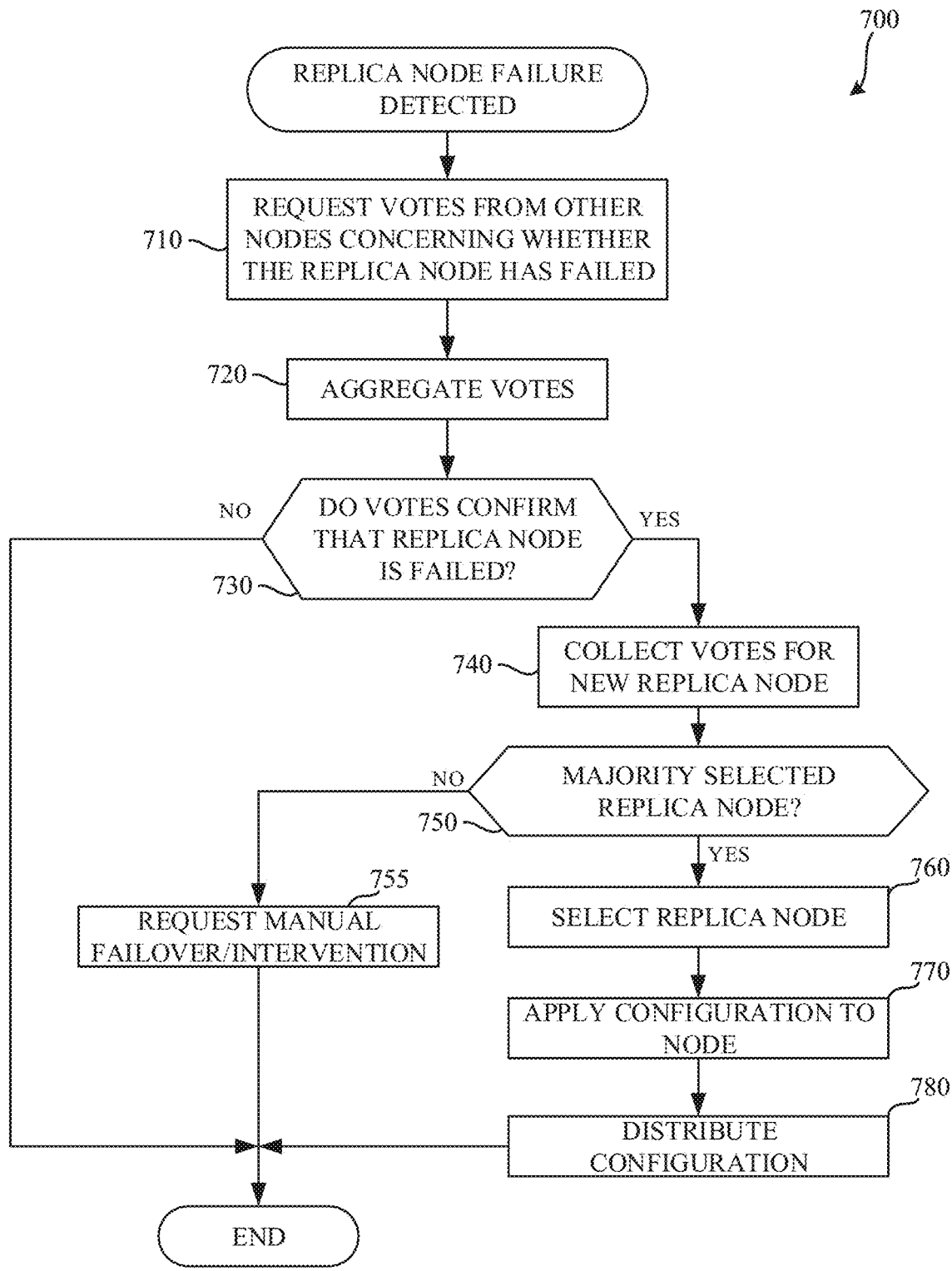
FIG. 7 is a flowchart representative of machine-readable instructions which may be executed to implement the example agent of FIGS. 1 and/or 2 to handle a failure of the replica node.

FIG. 7 is a flowchart representative of machine-readable instructions which may be executed to implement the example agent of FIGS. 1 and/or 2 to handle a failure of the replica node. In examples disclosed herein, the example process 700 represents an example implementation of block 555 of FIG. 5. The example process 700 of FIG. 7 begins when the example remote node monitor 225 and/or the example local node interface 220 detect a failure of the replica node. (see block 550 of FIG. 5). In examples where the agent is implemented at the replica node, the example local node interface 220 interfaces with the example replica database 154 to detect the failure. In contrast, in examples where the agent is implemented at a node other than the replica node (e.g., at the master node 130, at the node 170), the example remote node monitor 225 monitors the replica database 154 executed at the replica node 150.

Upon detection of a failure of the replica node, the example vote processor 250 requests votes from other nodes concerning whether those other nodes believe the replica to be failed as well. (Block 710). In some examples, a momentary loss of connectivity may have been detected, resulting in a false identification of a failure of the replica node. To ensure that false identifications of a failure do not inadvertently result in changes to the database system being applied (e.g., a new replica node being selected), the example vote processor 250 requests votes from other nodes concerning whether those other nodes believe the replica node to be failed as well. In examples disclosed herein, the votes are requested by transmitting a representational state transfer (REST) request to those other nodes requesting a vote. Votes are then provided back to the requestor via a response to the REST request. However, any other approach for soliciting votes may additionally or alternatively be used.

The example vote processor 250 aggregates the received votes. (Block 720). The example vote processor determines whether the votes confirm that the replica node has failed. (Block 730). In examples disclosed herein, the replica node is considered to have failed when a threshold number of votes confirming the failure are received. In examples disclosed herein, the threshold represents 50% of the received votes. However, in some examples, additional thresholds may additionally or alternatively be used to ensure, for example, that a minimum number of votes (e.g., a quorum) have been received.

If the example vote processor 250 determines that the received votes confirm that the replica node has failed (e.g., block 615 returns a result of YES), the example vote processor 250 collects votes for which node will assume the role of the replica node. (Block 740). In some examples, when a remote node identifies that the current replica node has failed, the remote node also provides a vote for which node should become the new replica node, thereby reducing the need for additional communications to select a new replica node. In examples disclosed herein, such votes are requested by transmitting a representational state transfer (REST) request to those other nodes requesting a vote. Votes are then provided back to the requestor via a response to the REST request. However, any other approach for soliciting votes may additionally or alternatively be used.

The example vote processor 250 determines whether the votes resulted in a majority selection of the replica node. (Block 750). In examples disclosed herein, the replica node is selected when at least than 50% of the participating nodes have voted for a single replica node. However, any other type of voting scheme/system may additionally or alternatively be used such as, for example, selecting the node that receives the most number of votes for becoming the replica node, selecting the node receiving at least 70% of the votes to become the replica node, etc. In some examples, the replica node is only allowed to be selected when a quorum of votes is present. That is, the replica node may only be selected when a minimum vote threshold is met (e.g., when at least 50% of the nodes participating in the database system have provided a vote). If the example vote processor 250 determines that the replica node cannot be selected (e.g., block 750 returns a result of NO), the example intervention requester 290 requests a manual failover and/or manual intervention. (Block 755). In examples disclosed herein, the manual failover and/or manual intervention are requested by displaying a prompt to an administrator of the database system 110. However, any other approach to requesting a manual failover and/or manual intervention may additionally or alternatively be used such as, for example, transmitting a message (e.g., an email message, a short message service (SMS) message, etc.) to an administrator of the database system 110.

If the example vote processor 250 determines that the replica node can be selected (e.g., block 750 returns a result of YES), the example vote processor 250 selects the replica node based on the received votes. (Block 760). In examples disclosed herein, a single replica node is selected. However, in some examples, multiple replica nodes may be selected.

Upon selecting a replica node, the example vote processor 250 updates the configuration stored in the configuration data store 215 to identify the new selected replica node. The example reverse proxy interface 210 and the local node interface 220 then apply the configuration stored in the example configuration data store 215 to the node. (Block 770). In examples disclosed herein, the example local node interface 220 identifies, to the database of the node on which the agent 142 is operated, whether that database is the master database, whether that database is the replica database, and an identification of which node(s) are the replica node(s). The example reverse proxy interface 210 configures the reverse proxy 138 such that incoming queries are transmitted to the master node (formerly the replica node) for processing. The example vote processor 250 then distributes the configuration stored in the configuration data store 215 to the other nodes operating in the database system 110. (Block 780). In examples disclosed herein, the configuration is distributed via the agent communicator 260, and is then applied to the other nodes in the database system 110. In this manner, the other nodes in the database system can become updated to, for example, operate as a replica node (if selected as such) and/or forward incoming queries to the appropriate master node. The example process 700 of the illustrated example of FIG. 7 then completes, and control returns to block 560 of FIG. 5.

Figure 8:
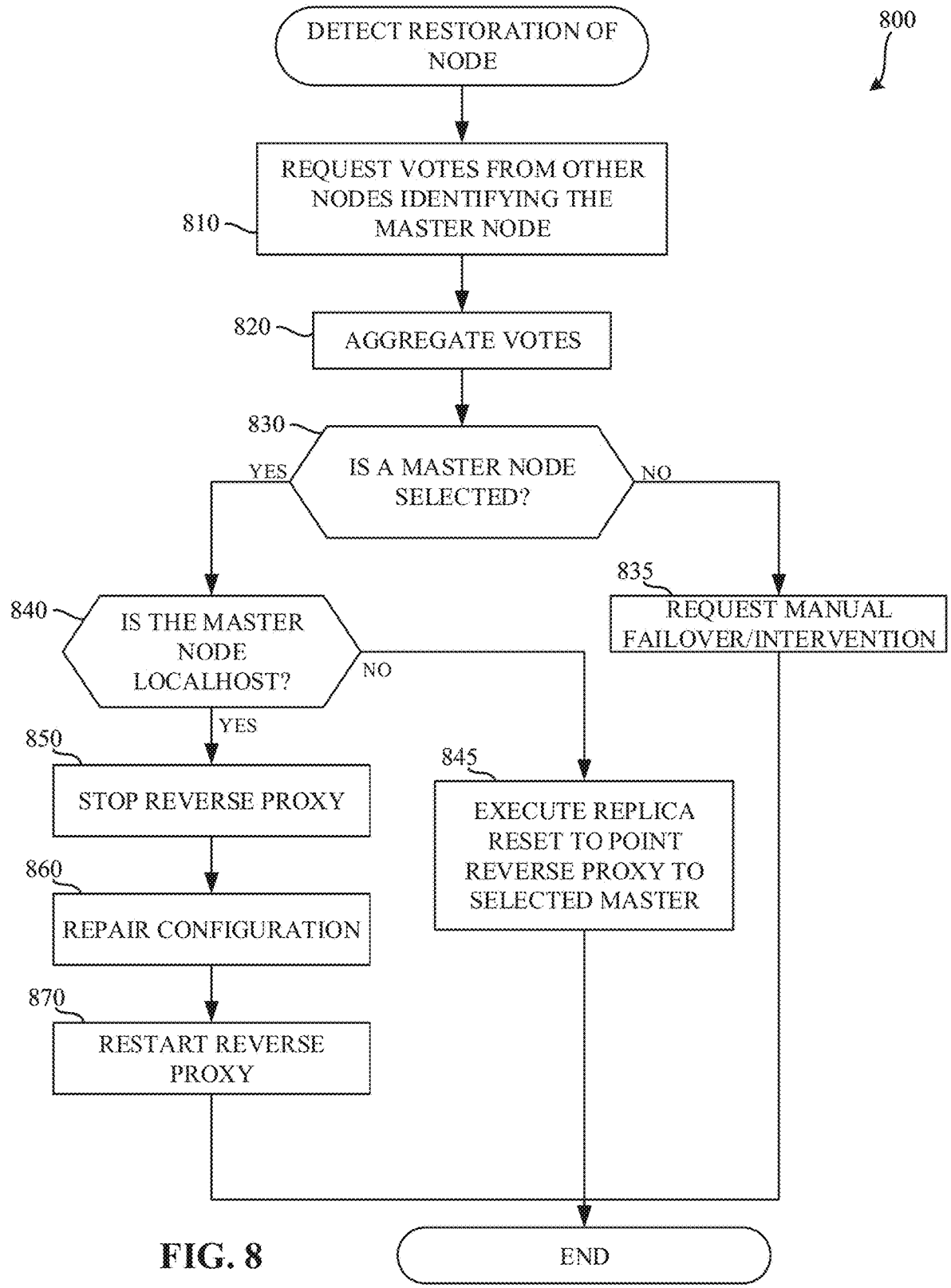
FIG. 8 is a flowchart representative of machine-readable instructions which may be executed to implement the example agent of FIGS. 1 and/or 2 to handle detection of restoration of a node.

FIG. 8 is a flowchart representative of machine-readable instructions which may be executed to implement the example agent of FIGS. 1 and/or 2 to handle detection of restoration of a node. In examples disclosed herein, the example process 800 represents an example implementation of block 565 of FIG. 5. The example process 800 of FIG. 8 begins when the example local node interface 220 detects that the database 134, 154, 175 has recovered from a failure (e.g., has returned to an online state) (see block 550 of FIG. 5). In some examples, a recovery from a failure may be made quickly enough that other nodes had not yet accounted for such a failure. However, such a configuration update is possible. Thus, to account for such a situation, the example vote processor 250 requests votes from other nodes identifying the master node. (Block 810). In some examples, additional information such as, for example, the configuration(s) of those remote nodes may be requested as well. In examples disclosed herein, the votes are requested by transmitting a representational state transfer (REST) request to those other nodes requesting a vote concerning the identity of the current master node. Votes are then provided back to the requestor via a response to the REST request. However, any other approach for soliciting votes may additionally or alternatively be used.

The example vote processor 250 aggregates the received votes. (Block 820). The example vote processor determines whether the votes identify a master node. (Block 830). In examples disclosed herein, the master node is identified when a threshold number of the votes identify a same master node. In examples disclosed herein, the threshold represents 50% of the received votes. However, in some examples, additional thresholds may additionally or alternatively be used to ensure, for example, that a minimum number of votes (e.g., a quorum) have been received.

If the example vote processor 250 cannot identify a master node based on the received votes (e.g., block 830 returns a result of NO), the example intervention requestor 290 requests a manual failover and/or manual intervention. (Block 835). In examples disclosed herein, the manual failover and/or manual intervention are requested by displaying a prompt to an administrator of the database system 110. However, any other approach to requesting a manual failover and/or manual intervention may additionally or alternatively be used such as, for example, transmitting a message (e.g., an email message, a short message service (SMS) message, etc.) to an administrator of the database system 110.

Returning to block 830, if a master node is identified (e.g., block 830 returns a result of YES), the example former master detector 255 determines whether the identified master node is the same node on which the agent 142 is operated. (Block 840). That is, the other nodes believe that the node that had just detected that it has recovered from a failure is the master node. In examples disclosed herein, the example former master detector 255 determines whether the identified master is the same node on which the agent 142 is operated by comparing a hostname of the node on which the former master detector 255 (and/or agent 142) is operated against a hostname of the identified master node. If the example former master detector 255 determines that the node was not previously the master node, the example reverse proxy interface 210 interacts with the example reverse proxy to execute a replica reset, thereby ensuring that the reverse proxy is pointed to the selected master node. (Block 845).

Returning to block 840, if the example former master detector 255 determines that the identified master node is the same node on which the agent 142 is operated (e.g., block 840 returns a result of YES), the example reverse proxy interface 210 interacts with the reverse proxy to stop the reverse proxy. (Block 850). The example reverse proxy interface 210 then repairs the configuration of the reverse proxy. (Block 860). The example reverse proxy interface 210 then restarts the reverse proxy. (Block 870). Such an approach ensures that the reverse proxy is pointing to the correct master node. The example process 800 of the illustrated example of FIG. 8 then completes, and control returns to block 505 of FIG. 5.

Figure 9:
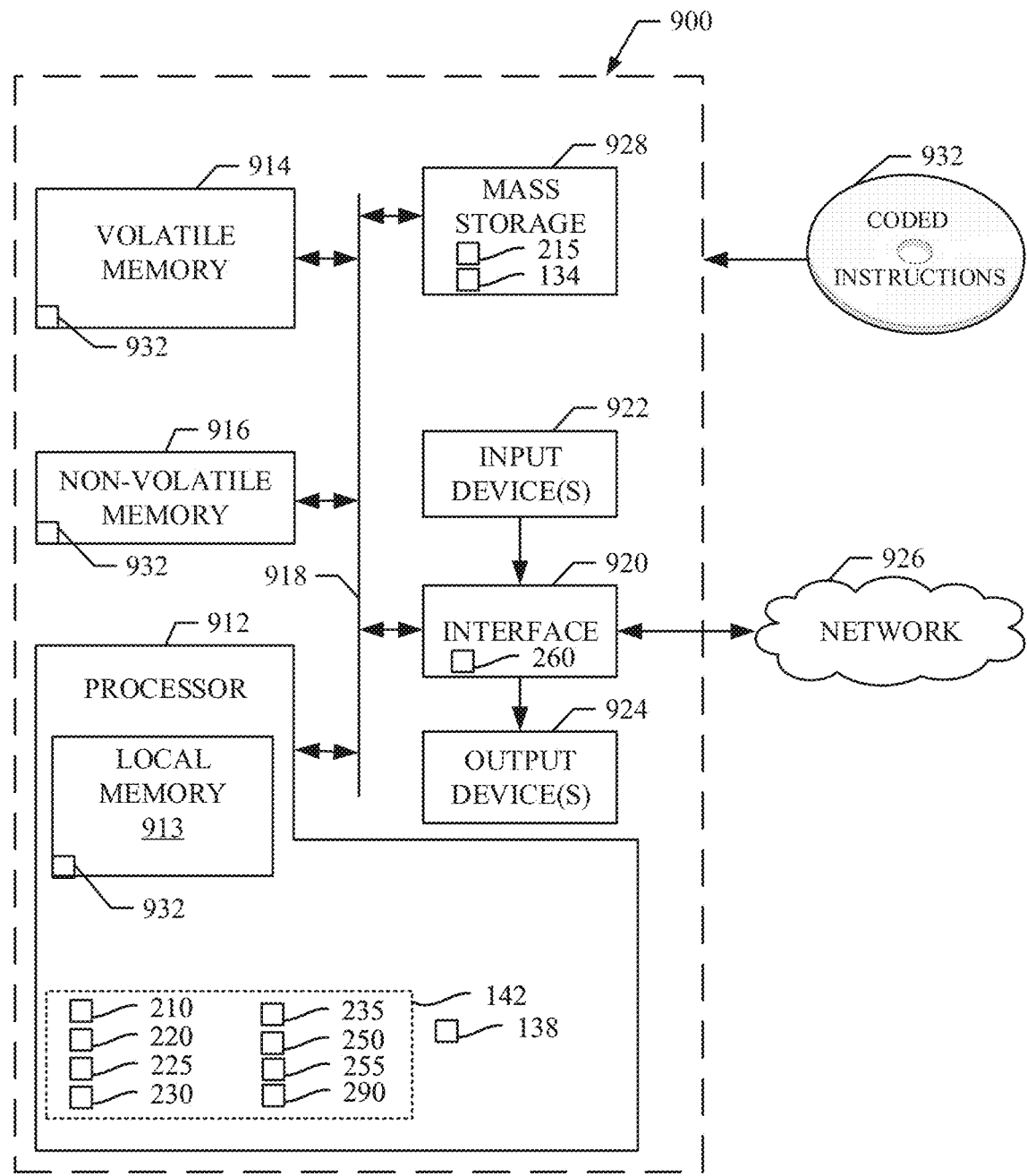
FIG. 9 is a block diagram of an example processing platform structured to execute the instructions of FIGS. 3, 4, 5, 6, 7, and/or 8 to implement the example node of FIG. 1.

FIG. 9 is a block diagram of an example processing platform structured to execute the instructions of FIGS. 3, 4, 5, 6, 7, and/or 8 to implement the example node of FIG. 1. The processor platform 900 can be, for example, a server, a personal computer, a workstation, a self-learning machine (e.g., a neural network), a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, a set top box, a headset or other wearable device, or any other type of computing device.

The processor platform 900 of the illustrated example includes a processor 912. The processor 912 of the illustrated example is hardware. For example, the processor 912 can be implemented by one or more integrated circuits, logic circuits, microprocessors, GPUs, DSPs, or controllers from any desired family or manufacturer. The hardware processor may be a semiconductor based (e.g., silicon based) device. In this example, the processor implements the example reverse proxy interface 210, the example local node interface 220, the example remote node monitor 225, the example master node selector 230, the example replica selector 235, the example vote processor 250, the example former master detector 255, the example intervention requestor 290, and/or the example reverse proxy 138.

The processor 912 of the illustrated example includes a local memory 913 (e.g., a cache). The processor 912 of the illustrated example is in communication with a main memory including a volatile memory 914 and a non-volatile memory 916 via a bus 918. The volatile memory 914 may be implemented by Synchronous Dynamic Random Access Memory (SDRAM), Dynamic Random Access Memory (DRAM), RAMBUS® Dynamic Random Access Memory (RDRAM®) and/or any other type of random access memory device. The non-volatile memory 916 may be implemented by flash memory and/or any other desired type of memory device. Access to the main memory 914, 916 is controlled by a memory controller.

The processor platform 900 of the illustrated example also includes an interface circuit 920. The interface circuit 920 may be implemented by any type of interface standard, such as an Ethernet interface, a universal serial bus (USB), a Bluetooth® interface, a near field communication (NFC) interface, and/or a PCI express interface. In the illustrated example of FIG. 9, the example interface 920 implements the example agent communicator 260.

In the illustrated example, one or more input devices 922 are connected to the interface circuit 920. The input device(s) 922 permit(s) a user to enter data and/or commands into the processor 912. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 924 are also connected to the interface circuit 920 of the illustrated example. The output devices 924 can be implemented, for example, by display devices (e.g., a light emitting diode (LED), an organic light emitting diode (OLED), a liquid crystal display (LCD), a cathode ray tube display (CRT), an in-place switching (IPS) display, a touchscreen, etc.), a tactile output device, a printer and/or speaker. The interface circuit 920 of the illustrated example, thus, typically includes a graphics driver card, a graphics driver chip and/or a graphics driver processor.

The interface circuit 920 of the illustrated example also includes a communication device such as a transmitter, a receiver, a transceiver, a modem, a residential gateway, a wireless access point, and/or a network interface to facilitate exchange of data with external machines (e.g., computing devices of any kind) via a network 926. The communication can be via, for example, an Ethernet connection, a digital subscriber line (DSL) connection, a telephone line connection, a coaxial cable system, a satellite system, a line-of-site wireless system, a cellular telephone system, etc.

The processor platform 900 of the illustrated example also includes one or more mass storage devices 928 for storing software and/or data. Examples of such mass storage devices 928 include floppy disk drives, hard drive disks, compact disk drives, Blu-ray disk drives, redundant array of independent disks (RAID) systems, and digital versatile disk (DVD) drives.

The machine executable instructions 932 of FIGS. 3, 4, 5, 6, 7, and/or 8 may be stored in the mass storage device 928, in the volatile memory 914, in the non-volatile memory 916, and/or on a removable non-transitory computer readable storage medium such as a CD or DVD. In the illustrated example of FIG. 9, the example mass storage device 928 implements the example configuration data store 215 and/or the example database 134, 154, 174.

From the foregoing, it will be appreciated that example methods, apparatus and articles of manufacture have been disclosed that enable queries transmitted to a database system to be handled in a transparent manner, while minimizing any amount of downtime due to a failure of the database. As a result of the load balancing provided by the load balancer, incoming query workload is distributed among reverse proxies operated at each of the nodes. Instead of locally executing the incoming queries, those reverse proxies forward the incoming request to the database operated at the (current) master node. In this manner, incoming requests are ensured to reach the master node for execution. Moreover, because reverse proxies are notified of database failures by an agent operated at the same node as the reverse proxy, the configuration of the reverse proxy can be quickly updated to forward the incoming queries to a new master node (e.g., a node that was previously a replica node), thereby minimizing any amount of down-time resulting from a failure.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. A database system comprising:
    a hardware-implemented load balancer, the load balancer to relay a query to at least one of a master node or a replica node, the master node and the replica node included in a plurality of nodes;
    a hardware-implemented node from the plurality of nodes, the hardware-implemented node including an agent to select a first node as the master node and a second node as the replica node, the selection of the master node and the replica node based on votes from the plurality of nodes;
    the hardware-implemented master node, the master node including:
        a first database configured as a master database in a master-replica replication configuration; and
        a first reverse proxy to receive the query from the load balancer, determine that the first database is the master database, and forward the query to the master database; and
    the hardware-implemented replica node, the replica node including:
        a second database configured as a synchronous replica in the master replica replication configuration; and
        a second reverse proxy to receive the query from the load balancer, determine that the first database is the master database, and forward the query to the master database.

2. The database system of claim 1, wherein the agent is a first agent, wherein the master node further includes a second agent to configure the first reverse proxy to forward the query to the master database.

3. The database system of claim 1, wherein the agent is a first agent, wherein the replica node further includes a second agent to configure the second reverse proxy to forward the query to the master database.

4. The database system of claim 1, wherein the load balancer is to relay the query to at least one of the master node, the replica node, or a third node, the third node including:
    a third database; and
    a third reverse proxy to receive the query from the load balancer, determine that the first database is the master database, and forward the query to the master database.

5. The database system of claim 4, wherein
    the agent is to monitor the master node and the replica node and, in response to detection of a failure of the master node, cause the second database to be reconfigured to act as the master database in the master replica replication configuration.

6. The database system of claim 5, wherein the agent is to cause the third database to be reconfigured to operate as the synchronous replica database in the master replica replication configuration.

7. The database system of claim 1, wherein the query, when executed at the first database, does not return a result until the query has also been executed at the second database.

8. The database system of claim 7, wherein at least one of the first reverse proxy or the second reverse proxy is to transmit the result of the execution of the query to a query source via the load balancer.

9. A node within a database system having a plurality of nodes, the node comprising:
    an agent to select a first database operated at the node from the plurality of nodes to function as a master database in a master-replica replication configuration, the selection of the master database based on votes from the plurality of nodes, the plurality of nodes associated with different databases, the plurality of nodes implemented by hardware, the agent to cause the selected database to be configured as the master database, the agent to configure a first reverse proxy of the node; and a first reverse proxy to receive a query from a load balancer and forward the query to the master database based on the configuration of the first reverse proxy.

10. The node of claim 9, wherein the votes from the plurality of nodes are based on communications latencies between the agent and each of the plurality of nodes.

11. The node of claim 9, wherein the agent is to select a second database operated at one of the plurality of nodes to function as a replica database in the master-replica replication configuration, the second database separate from the first database.

12. The node of claim 11, wherein the agent is to monitor the first database and the second database to detect a failure of one of the first database or the second database.

13. The node of claim 12, wherein the agent, in response to detection of the failure of the first database, is to cause the second database to become reconfigured to operate as the master database in the master-replica replication configuration, and to configure a third database to operate as the replica database in the master-replica replication configuration.

14. The node of claim 13, further including one of the first database, the second database, or the third database.

15. The node of claim 11, further including the first database, the agent is further to configure the first database to, upon receipt of the query, not return a result until the query has also been executed at the second database.

16. At least one non-transitory computer-readable medium comprising instructions which, when executed, cause at least one processor to at least:

relay a query to at least one of a master node or a replica node;

select a first database operated by the master node from a plurality of nodes in a database system to function as a master database in a master-replica replication configuration, the selection of the master database based on votes from the plurality of nodes, the plurality of nodes associated with different databases, the plurality of nodes implementing hardware;

cause the first database to be configured as the master database;

configure a first reverse proxy executed by the at least one processor to, upon receipt of a query, forward the query to the master database;

select a second database operated by the replica node from the plurality of nodes in the database system to function as a synchronous replica in the master-replica replication configuration, the selection of the synchronous replica based on the votes from the plurality of nodes;

cause the second database to be configured as the synchronous replica; and configure a second reverse proxy executed by the at least one process to, upon receipt of the query forward the query to the master database.

17. The at least one non-transitory computer-readable medium of claim 16, wherein the votes from the plurality of nodes are based on communications latencies between the at least one processor and each of the plurality of nodes.

18. The at least one non-transitory computer-readable medium of claim 16, wherein the instructions, when executed, further cause the at least one processor to select a second database operated at one of the plurality of nodes to function as a replica database in the master-replica replication configuration, the second database separate from the first database.

19. The at least one non-transitory computer-readable medium of claim 18, wherein the instructions, when executed, further cause the at least one processor to monitor the first database and the second database to detect a failure of one of the first database or the second database.

20. The at least one non-transitory computer-readable medium of claim 19, wherein the instructions, when executed, further cause the at least one processor to, in response to detection of the failure of the first database:

cause the second database to become reconfigured to operate as the master database in the master-replica replication configuration; and configure a third database to operate as the replica database in the master-replica replication configuration.

* * * * *